(12) United States Patent
Shirakawa (10) Patent No.: US 6,485,194 B1
(45) Date of Patent: Nov. 26, 2002

(54) OPTICAL CONNECTOR

(75) Inventor: Tsuguhito Shirakawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 177 days.

(21) Appl. No.: 09/630,741

(22) Filed: Aug. 2, 2000

(30) Foreign Application Priority Data

Aug. 5, 1999 (JP) ............................................ 11-222159

(51) Int. Cl.7 ................................................. G02B 6/36
(52) U.S. Cl. .......................... 385/78; 439/456; 439/700
(58) Field of Search .............................. 385/78, 77, 75; 439/462, 456, 700

(56) References Cited

FOREIGN PATENT DOCUMENTS

| EP | 0 629 887 A | 12/1984 |
|---|---|---|
| GB | 2 032 130 A | 4/1990 |
| JP | 10-78534 | 3/1998 |
| JP | 10 078534 A | 3/1998 |

*Primary Examiner*—Neil Abrams
*Assistant Examiner*—Phuong Dinh
(74) *Attorney, Agent, or Firm*—Armstrong, Westerman & Hattori, LLP (57) ABSTRACT

An optical connector as an optical plug is provided, which includes: an optical fiber cable; a ferrule connected to an end of the optical fiber cable and constructing a ferrule assembly along with the optical fiber cable; a spring arranged over the optical fiber cable, an end of the spring pressing the ferrule; a plug housing to accommodate the ferrule assembly and the spring; and a spring cap to be connected to the plug housing for supporting another end of the spring and for curvingly leading the optical fiber cable, wherein a curved portion, provided inside the spring cap, of the optical fiber cable has a thinner cover than another portion.

3 Claims, 7 Drawing Sheets

OPTICAL CONNECTOR

BACKGROUND OF THE INVENTION

1. Field of the Invention

The present invention relates generally to an optical connector, and more particularly to an optical connector as an optical plug wherein an optical fiber cable is led out in a direction different from an axial direction of a ferrule connected with the optical fiber cable.

2. Description of the Related Art

An optical connector is used to connect an optical fiber cable with a transmitter, a receiver, or another optical fiber cable constituting a multiplex transmission circuit, for example, of a vehicle such as motor vehicle.

Because the optical fiber cable is weak in extreme bending and distortion, the optical fiber cable is usually led out of the optical connector straight. In a circumstance, like in a vehicle, that various electric equipment and wiring harnesses are thickly arranged, however, the optical fiber cable is often led out of the optical connector, while being curved in a minimum bending radius.

Figure 10:
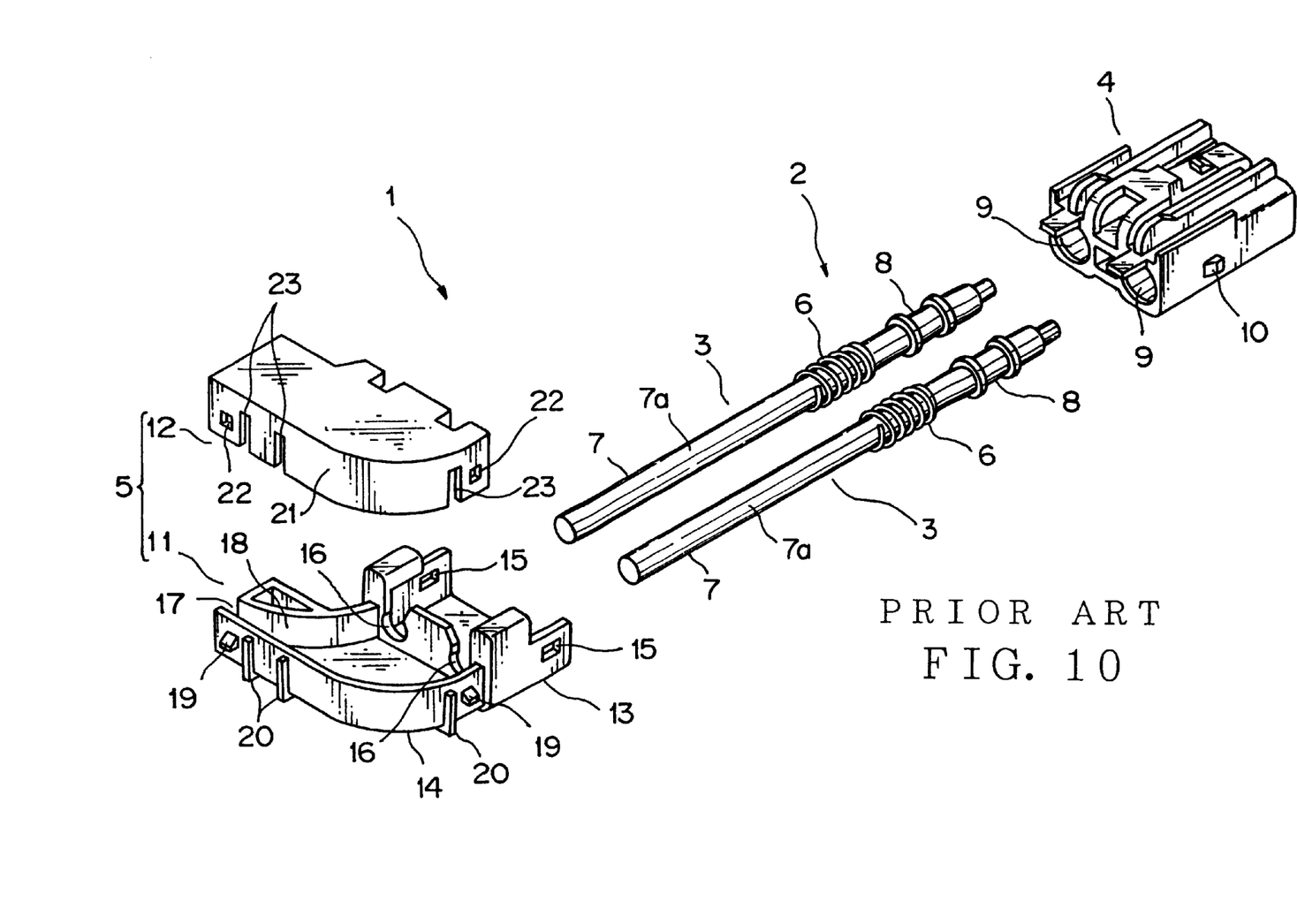
FIG. 10 is an exploded perspective view of a prior art optical plug.

An optical connector disclosed in Japanese Patent Application Laid-open No. 10-78534 is known as an optical connector with a curved optical fiber cable. And, another optical connector 1 shown in FIG. 10 is also used.

Hereinafter, the above optical connector 1 will be described, referring to FIG. 10. The optical connector 1 consists of a receptacle (not illustrated) and an optical plug 2 to be coupled with the receptacle. The optical plug 2 has ferrule assemblies 3, a plug housing 4, and a spring cap 5.

The ferrule assembly 3 is formed by connecting a ferrule 8 on the end of an optical fiber cable 7 on which a compression spring 6 is arranged. One end of the compression spring 6 abuts against the ferrule 8.

The plug housing 4 couples with a coupling portion (not illustrated) of the receptacle and has longitudinal accommodating chambers 9 to accommodate the respective ferrule assemblies 3. And, a claw-like engaging projection 10 is protrusively-provided on each sidewall of the plug housing 4. (One engaging projection 10 is illustrated.)

The spring cap 5 consists of a lower spring cap 11 and an upper spring cap 12, which lower spring cap 11 engages the rear of the plug housing 4.

The lower spring cap 11 has an engaging portion 13 to engage the plug housing 4 and a leading-out direction restricting portion 14 to restrict the direction of the optical fiber cables. The engaging portion 13 is provided with four-sided holes 15 to engage the engaging projections 10 and fiber leading-out portions 16 against which the other ends of the respective compression springs 6 abut and through which the optical fiber cables 7 pass.

The leading-out direction restricting portion 14 curves the optical fiber cables 7 by about 90° for leading them in a lateral direction. The curved optical fiber cables 7 are led outside out of an opening portion 17 provided on the leading-out direction restricting portion 14. A sidewall of the leading-out direction restricting portion 14, at a side of a smaller radius of curvature, is provided with a supporting surface 18 curving in a circular-arc. And, another sidewall of the leading-out direction restricting portion 14, at a side of a large radius of curvature, is provided with engaging projections 19 and ribs 20 to engage the upper spring cap 12 and is formed to make the optical fiber cables 7 curve.

The upper spring cap 12 is formed to cover the leading-out direction restricting portion 14 of the lower spring cap 11. And, a sidewall 21 of the upper spring cap 12 is provided with four-sided holes 22 to engage the above engaging projections 19 and guide grooves 23 to receive the above ribs 20.

With respect to the above conventional optical connector 1, however, because the optical fiber cable 7 connected to the ferrule 8 is thick, the rigidity of the optical fiber cable 7 is big, thereby bringing about poor work efficiency and making the optical connector large. Further, because the compression spring 6 is pushed by the optical fiber cable 7, the action of the compression spring 6 would be hindered, thereby making a connecting force bigger.

Figure 11:
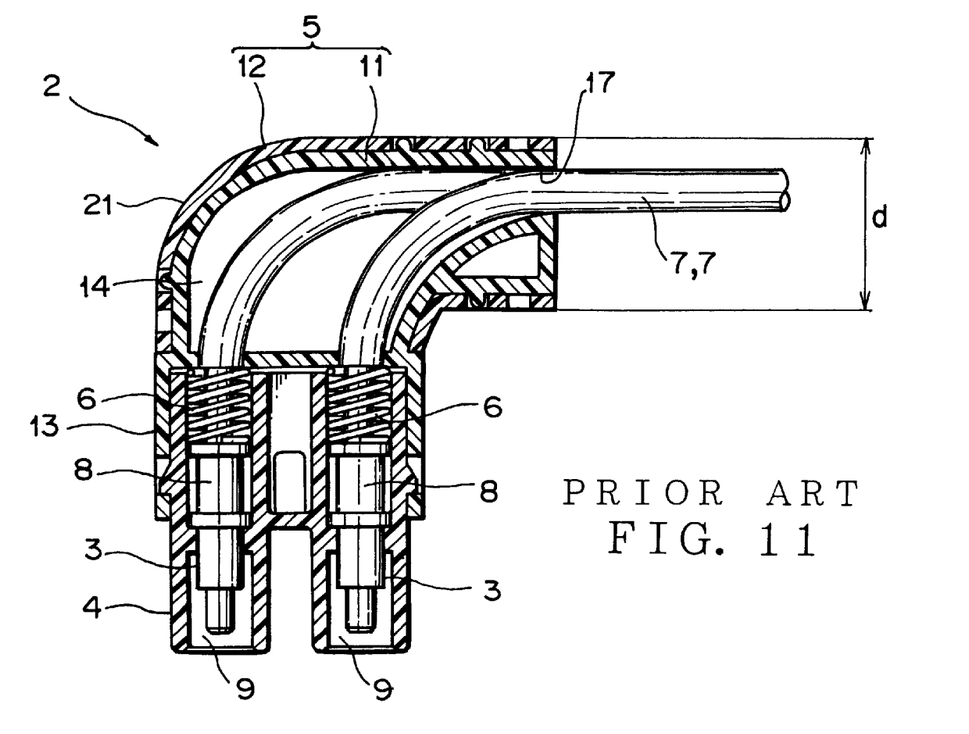
FIG. 11 is a sectional view of the prior art optical plug shown in FIG. 10.

More specifically, because the optical fiber cable 7 generally has a core fiber portion (not illustrated), a primary sheathing (not illustrated) covering the core fiber portion, and a secondary sheathing 7a covering the primary sheathing, the optical fiber cable 7 is fairly thick and has a fairly big rigidity. And, a work to accommodate the thick optical fiber cable 7 with a minimum radius of curvature in the spring cap 5, as shown in FIG. 11, causes poor work efficiency.

Also, because the thick optical fiber cable 7 needs the larger opening portion 17, an end width d of the spring cap 5 has to be larger, thereby making the optical plug larger.

Figure 1:
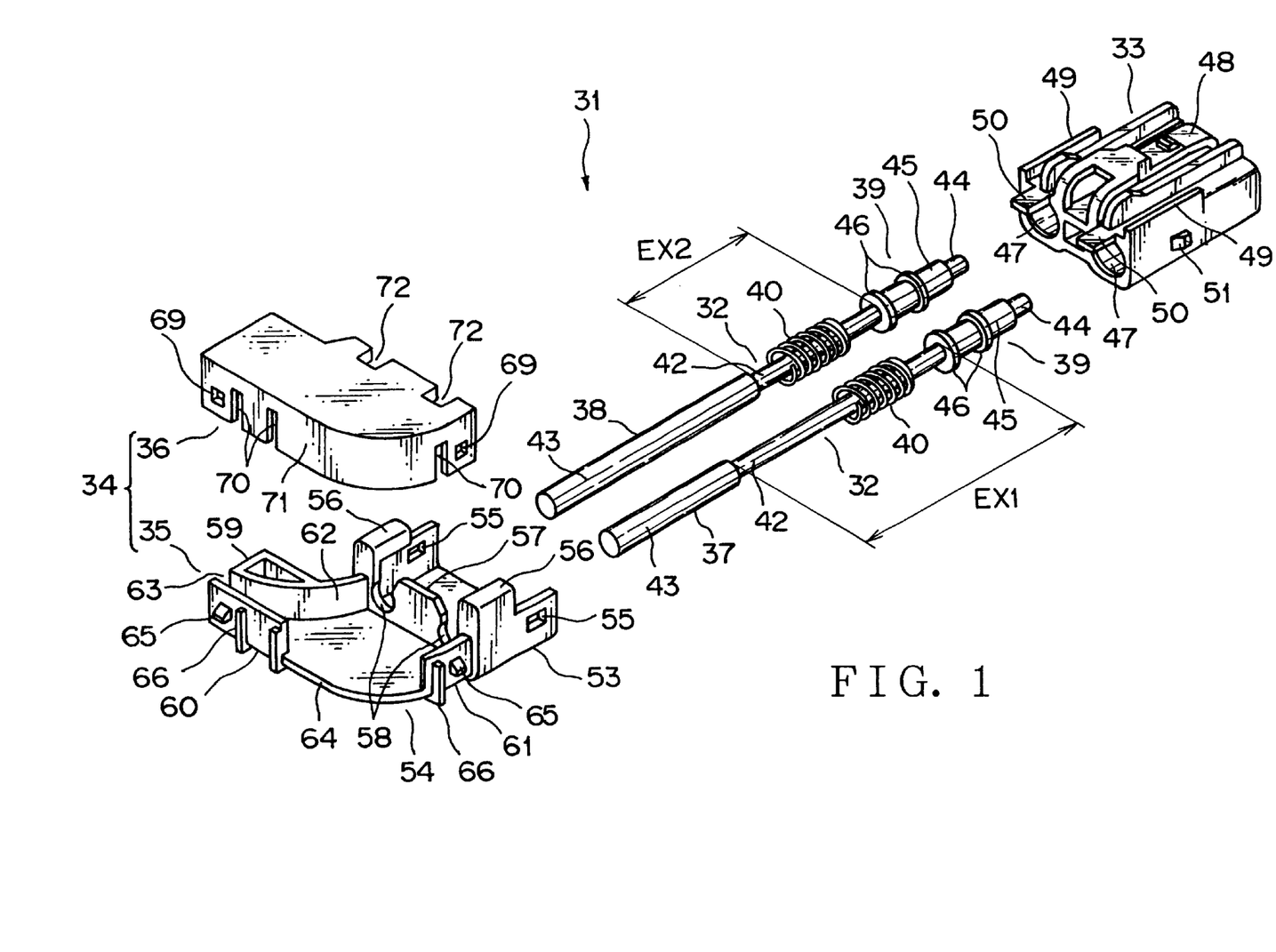
FIG. 1 is an exploded perspective view showing an embodiment of the optical plug of an optical connector in accordance with the present invention.

Further, as shown in FIG. 1, when the optical fiber cable 7 is curved with a minimum radius of curvature, the compression spring 6 is pushed by the optical fiber cable 7 toward an inside wall of the plug housing 4, the action of the compression spring 6 would be hindered, thereby making a connecting force with a receptacle (not illustrated) bigger.

SUMMARY OF THE INVENTION

In view of the foregoing, an object of the present invention is to provide an optical connector wherein the work efficiency is enhanced, a downsizing is achieved, and a connecting force is smaller.

In order to achieve the above-described object, as a first aspect of the present invention, an optical connector as an optical plug comprises: an optical fiber cable; a ferrule connected to an end of the optical fiber cable and constructing a ferrule assembly along with the optical fiber cable; a spring arranged over the optical fiber cable, an end of the spring pressing the ferrule; a plug housing to accommodate the ferrule assembly and the spring; and a spring cap to be connected to the plug housing for supporting another end of the spring and for curvingly leading the optical fiber cable, wherein a curved portion, provided inside the spring cap, of the optical fiber cable has a thinner cover than another portion.

As a second aspect of the present invention, in the structure with the above first aspect, the curved portion starts from a position of an end of the ferrule.

As a third aspect of the present invention, in the structure with the above second aspect, the curved portion ends near an exit opening portion of the spring cap.

According to the above-described structure of the present invention, the following advantages are provided.

(1) Because the optical fiber cable has thinner curved portions with lower rigidity the optical fiber cable can be curved easily, thereby improving the work efficiency.

(2) The spring for pushing the ferrule is arranged over the optical fiber cable securely within the set-up curved extent thereof. Because the optical fiber cable being within the set-up curved extent is thinner than that of the prior art one, the spring does not receive a pressure from the cable, which improves action of the spring, thereby reducing a force required for coupling the optical plug.

(3) The optical fiber cable is thinner than the prior art one at least within the optical plug. Therefore, because the opening portion for leading out the optical fiber cable can be narrower, thereby downsizing the optical plug.

The above and other objects and features of the present invention will become more apparent from the following description taken in conjunction with the accompanying drawings.

DESCRIPTION OF THE PREFERRED EMBODIMENT

An embodiment of the present invention will now be described in further detail with reference to the accompanying drawings.

Figure 2:
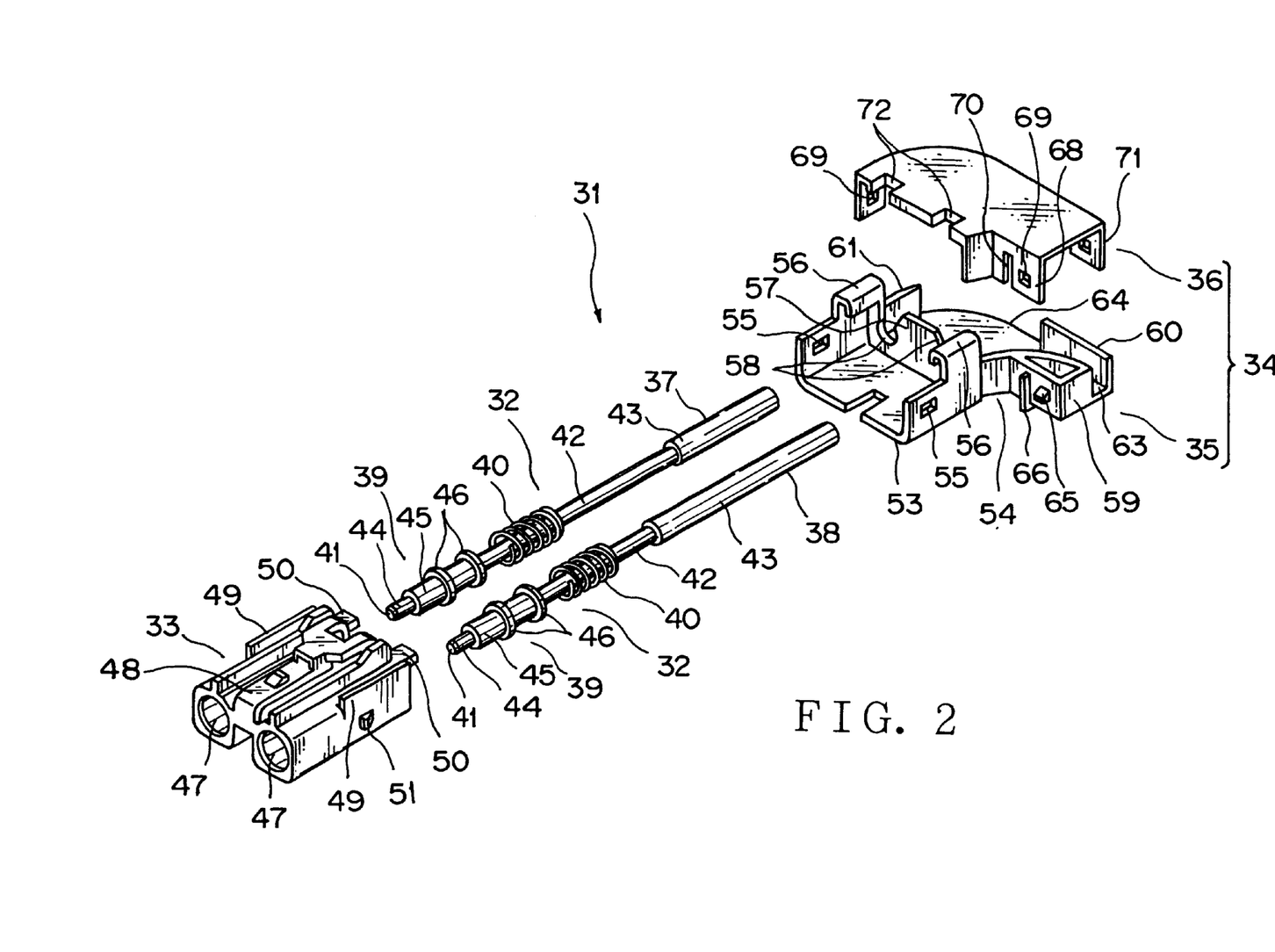
FIG. 2 is an exploded perspective view of the optical plug, taken reversely to FIG. 1.
Figure 3:
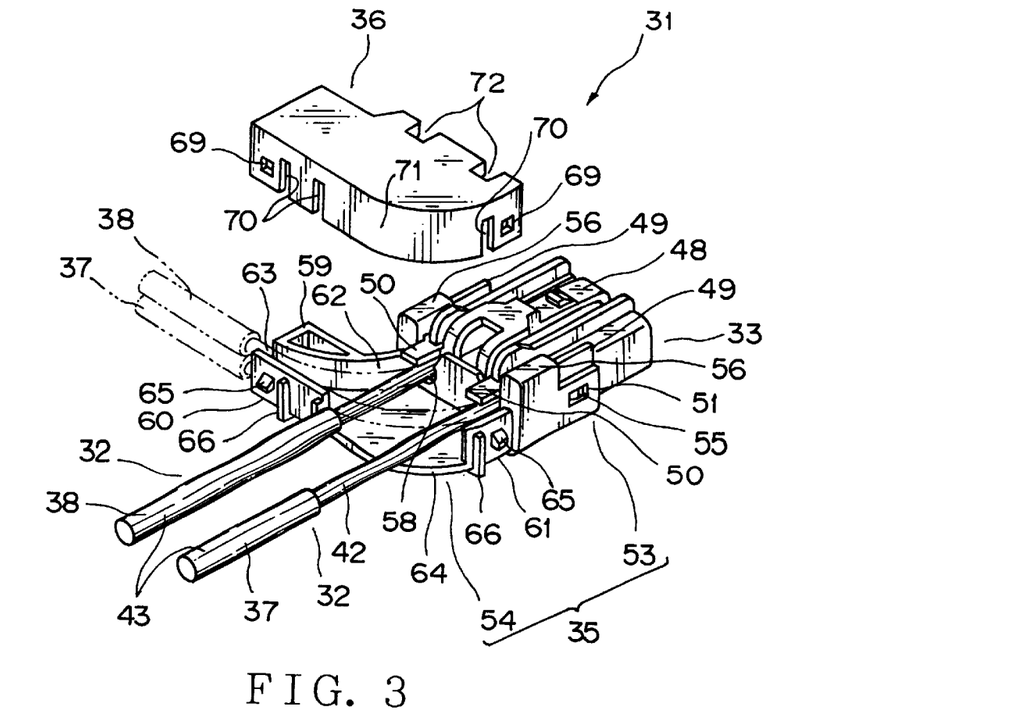
FIG. 3 is an exploded perspective view showing an assembling state of spring caps of the optical plug.
Figure 4:
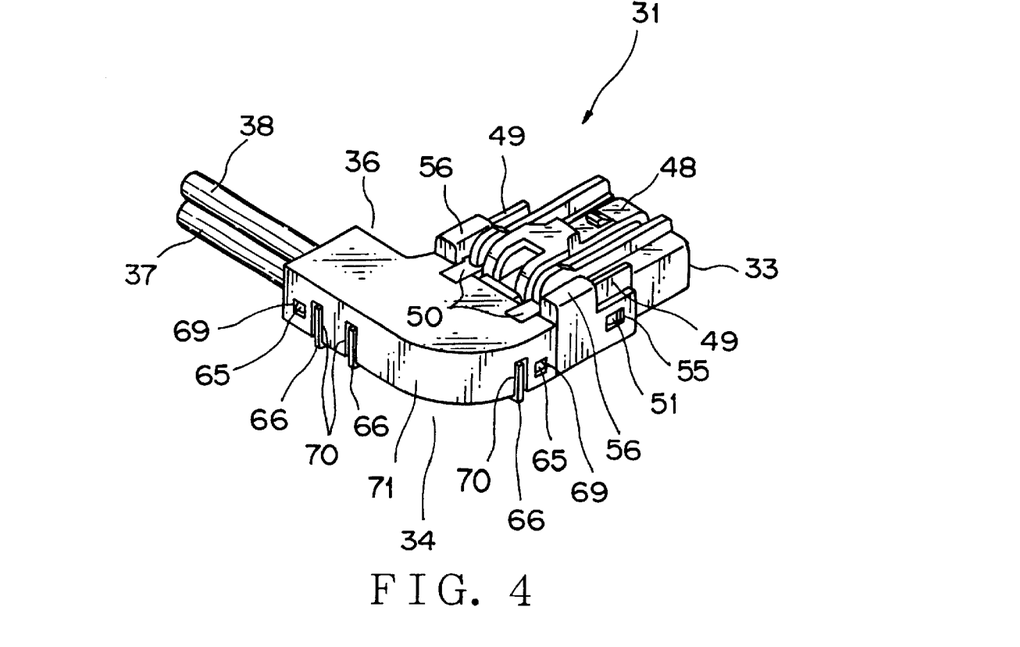
FIG. 4 is a perspective view showing a completely assembled state of the optical plug.
Figure 5:
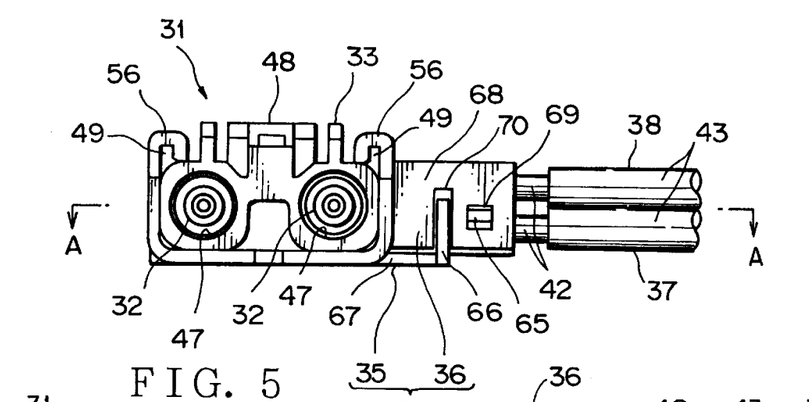
FIG. 5 is a front view of the optical plug.
Figure 6:
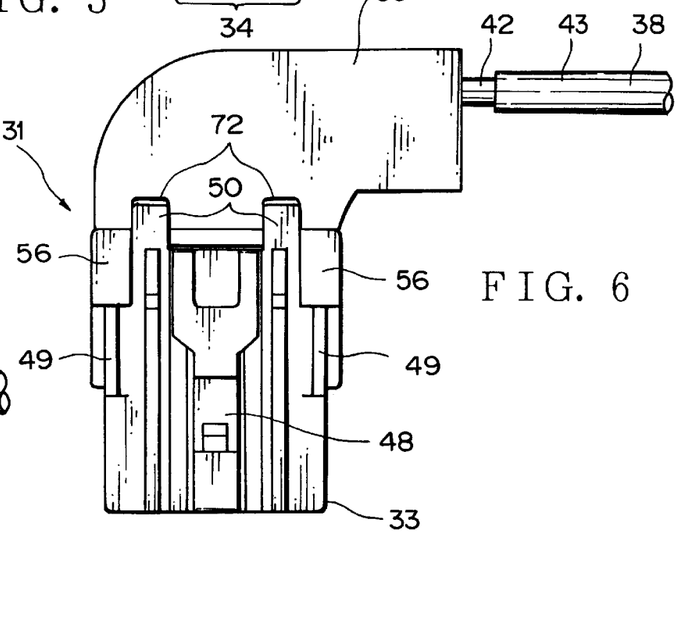
FIG. 6 is a plan view of the optical plug.
Figure 7:
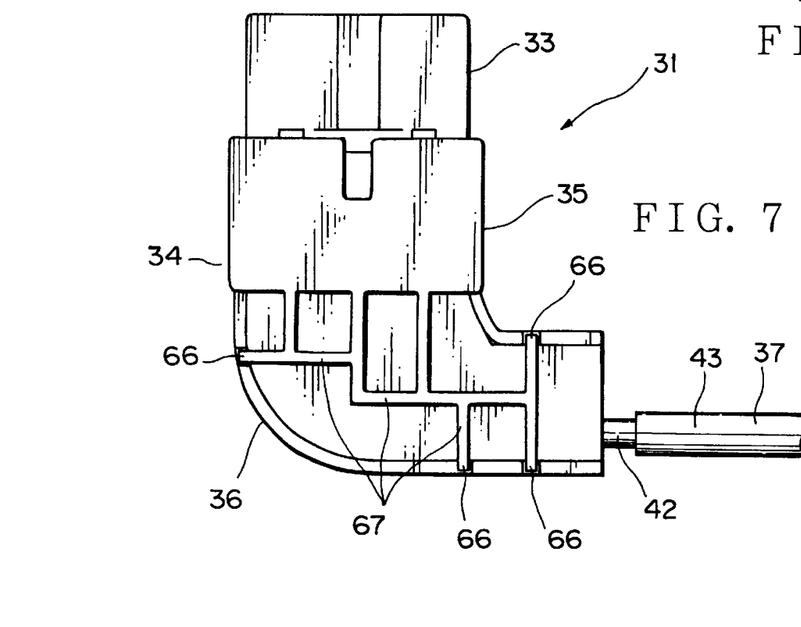
FIG. 7 is a bottom view of the optical plug.
Figure 8:
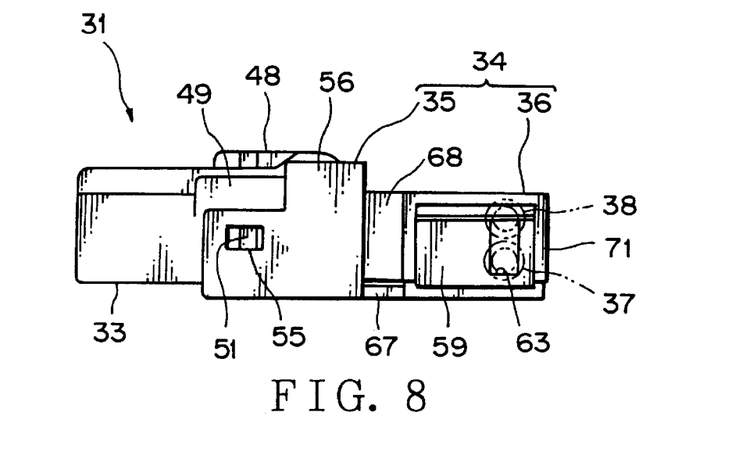
FIG. 8 is a side view of the optical plug.
Figure 9:
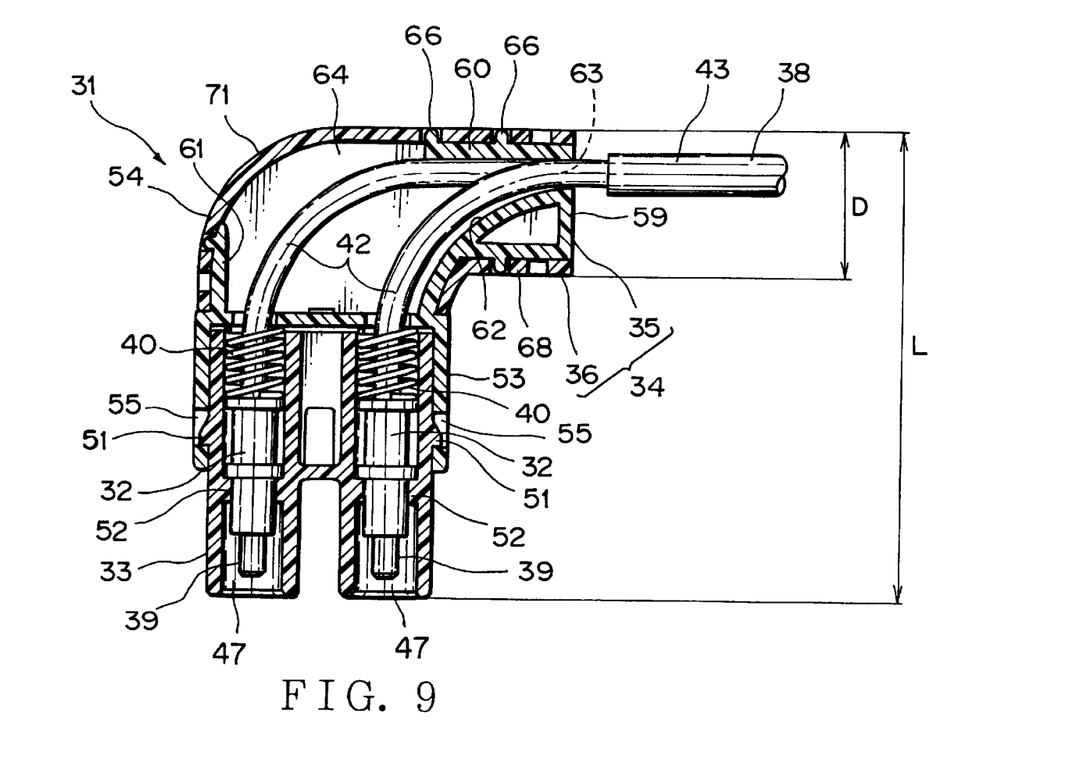
FIG. 9 is a sectional view taken along a line A—A in FIG. 5.

FIG. 1 is an exploded perspective view showing an embodiment of the optical plug of an optical connector in accordance with the present invention; FIG. 2 is an exploded perspective view of the optical plug, taken reversely to FIG. 1; FIG. 3 is an exploded perspective view showing an assembling state of spring caps of the optical plug; FIG. 4 is a perspective view showing a completely assembled state of the optical plug; FIG. 5 is a front view of the optical plug; FIG. 6 is a plan view of the optical plug; FIG. 7 is a bottom view of the optical plug; FIG. 8 is a side view of the optical plug; and FIG. 9 is a sectional view taken along a line A—A in FIG. 5.

In FIGS. 1 and 2, reference character 31 shows an optical plug which constitutes an optical connector along with an un-illustrated receptacle. The optical plug 31 consists of ferrule assemblies 32 to which respective optical fiber cables 37,38 each having a narrow portion are connected, a plug housing 33 to accommodate the ferrule assemblies 32, and a spring cap 34 to engage the rear of the plug housing 33.

The spring cap 34 consists of an upper spring cap 36 and a lower spring cap 35 to be coupled with the upper spring cap 36.

As shown in FIG. 3, the lower spring cap 35 can engage the rear of the plug housing 33 in a state of the optical fiber cables 37,38 being straightly led out of the rear end of the plug housing 33 accommodating the ferrule assemblies 32. And, the optical fiber cables 37,38 are set in a curved state as shown, and then the upper spring cap 36 is coupled to the lower spring cap 35 (FIG. 4).

First, the structural members are specifically described hereinafter.

As shown in FIGS. 1 and 2, the above ferrule assemblies 32 are made up of the optical fiber cables 37,38, the ferrules 39, and compression springs 40. The ferrule assemblies 32 are connected to the respective ends of the optical fiber cables 37,38, and the compression springs 40 are set around the optical fiber cables 37,38.

The optical fiber cables 37,38 consist of core fiber portions 41 (FIG. 2) each consisting of a core and an outer layer (hereinafter, a cladding), primary sheathings 42 covering the respective core fiber portions 41, and secondary sheathings 43 covering the respective primary sheathings 42. The above core fiber portion 41 having no sheathing is fit in a later-described small-diameter portion 44 of the ferrule 39. And, the core fiber portion 41 with only the primary sheathing 42 is fit in a later-described large-diameter portion 45 of the ferrule 39.

The primary sheathing 42 exposes within the limits between the rear end of the ferrule 39 and an exit of the lower spring cap 35 in a curved state of the optical fiber cable. In the present embodiment, curved extents EX1,EX2 wherein each primary sheathing 42 exposes are set up on the respective optical fiber cables 37, 38 are shown in FIG. 1.

Because the optical fiber cables 37,38 within the curved extents EX1,EX2 are thinner than the other portions thereof, the rigidity of the optical fiber cables lowers, thereby improving the work efficiency. Further, even if the optical fiber cables 37,38 are curved with the same radius as the conventional ones, the optical fiber cables 37,38 in a curved state do not suppress the springs 40.

Though the rear end of the ferrule 39 is a reference position of starting the curve of the cables in the present embodiment, the position is not limited to the rear end. Also, a position of ending the curve is not limited to the led-out position of the cable from the lower spring cap 35 to the outside. Futher, the core fiber portion 41 may be covered with three layers of sheathings instead of two. In this case, the outer two layers may be stripped off in the curved extent.

The length of the curved extents of the respective optical fiber cables 37,38 are different, i.e. EX1>EX2. That is, the exposed lengths of the respective primary sheathings 42 are different as shown in FIG. 1.

The ferrule 39 is formed in a cylindrical shape with a small-diameter portion, a large-diameter portion 45, and a step therebetween. A pair of flanges 46 are provided on the large-diameter portion 45. At the front end surface of the ferrule 39, i.e. at the front end surface of the small-diameter portion 44, the core fiber portion 41 of each of the optical fiber cables 37,38 is exposed.

One end of the compression spring 40 abuts against the flange 46. The compression spring 40 may be of the compression spring 6 of FIG. 10 and has a larger inside diameter than an outside diameter of the secondary sheathing 43. Because the compression springs 40 are arranged over the respective exposing portions (i.e. the curved extents EX1, EX2 with a smaller diameter) of the primary sheathings 42, there exists a large diameter-difference therebetween, which prevents the compression spring 40 from receiving pressure from the cable, thereby improving action of the compression spring 40 so as to reduce a force required for connecting the optical plug 31 with an receptacle (not illustrated).

The plug housing 33 is formed in a box-shape as shown in FIGS. 1–9, and accommodating chambers 47 are longitudinally formed therein. And, a locking arm 48, a pair of guide ribs 49 and a pair of fiber holding ribs 50 are provided on an upper wall of the plug housing 33. Also, a pair of claw-like engaging projections 51 are formed on the respective sidewalls.

The ferrule assemblies 32 are accommodated in the respective accommodating chambers 47 which have respective stoppers 52 for the respective ferrule assemblies 32 in their intermediate portions.

The locking arm 48 is provided at the middle portion of the upper wall of the plug housing 33 so as to couple with the receptacle (not illustrated).

The guide ribs 49 are formed continuing from the respective sidewalls thereof so as to prevent the lower spring cap 35 from slipping off.

The cantilevered fiber holding ribs 50 are arranged near respective rear openings of the accommodating chambers 47 so as to hold the respective optical fiber cables 37,38 (i.e. the primary sheathings 42 thereof) connected to the accommodated ferrule assemblies 32, thereby, for example, facilitating an assembly of the upper spring cap 36. And, when the optical fiber cables 37,38 are pulled upward before mounting the upper spring cap 36, a stress in each of the optical fiber cables 37,38 is weakened due to elasticity of the respective ribs 50.

The above lower spring cap 35 is formed in a L-shape as shown in FIGS. 1–9 and has an engaging portion 53 for the plug housing 33 and a leading-out direction restricting portion 54 for the optical fiber cables 37,38.

The engaging portion 53 continues to the leading-out direction restricting portion 54, and the hole 55 and the guide rib engaging portion 56 are formed on each of the sidewalls of the engaging portion 53. And, a partition 57 having fiber leading-out portions 58 is provided between the engaging portion 53 and the leading-out direction restricting portion 54.

The hole 55 is formed in a four-sided figure so as to engage the engaging projection 51. And, the guide rib engaging portion 56 has a groove for sliding the above guide rib 49 therein.

The fiber leading-out portions 58 each are formed in a U-shape from an upper edge of the partition 57 on which the ends of the compression springs 40 abut. That is, the ferrule assemblies 32 are pushed toward the front side of the plug housing 33 in a state of the lower spring cap 35 being engaging the rear of the plug housing 33.

The leading-out direction restricting portion 54 curves the optical fiber cables 37,38, being led out of the rear end of the plug housing 33, by about 90° and has three sidewalls 59,60,61.

The sidewall 59, at a side of a smaller radius of curvature, is provided with a supporting surface 62 curving in a circular-arc. And, the sidewall 60 is arranged substantially facing the supporting surface 62. The sidewall 60 checks restoration of the curved optical fiber cables 37,38 and forms one side of a later-described straight path.

Between the sidewalls 59,60 is formed an opening portion 63 which leads the curved optical fiber cables 37,38 outside. And, between the sidewalls 60,61 formed is another opening portion 64 which leads the straight optical fiber cables 37,38 outside.

A curved path to the opening portion 63 to lead the optical fiber cables 37,38 from the fiber leading-out portions 58 along the supporting surface 62 is formed on the leading-out direction restricting portion 54. And, as described above, the straight path with the opening portion 64 for the optical fiber cables 37,38 is formed on the leading-out direction restricting portion 54.

A width of the opening portion 63 is narrower than that of the prior art one because the optical fiber cables 37,38 are narrower, whereby an end width D (FIG. 9) of the spring cap 34 becomes narrower than the end width d of the prior art of FIG. 11, while shortening a full length L (FIG. 9) of the optical plug 31. Then, downsizing is attained. Further, the optical fiber cables 37,38 can be curved with a smaller radius of curvature than that of the prior art because of the lower rigidity thereof, thereby also shortening the full length L of the optical plug 31.

The three sidewalls 59,60,61 each are provided with an engaging projection 65 and a rib 66 for use in coupling with the upper spring cap 36, and each rib 66 continues to a reinforcing rib 67 (FIG. 5) formed on the backside of the leading-out direction restricting portion 54.

The above upper spring cap 36 to cover the leading-out direction restricting portion 54 is provided with a hole 69 to engage the above engaging projection 65 on the sidewall 68 which overlaps with the above sidewall 59 and a guide groove 70 to receive the above rib 66. And, a sidewall 71, which overlaps with the sidewalls 60,61 and closes the above opening portion 64, of the upper spring cap 36 is provided with the similar holes 69 and the guide grooves 70.

Reference character 72 designates recesses for receiving the fiber holding ribs 50 of the plug housing 33 when coupled with the lower spring cap 35.

Next, a detailed assembly process of the above optical plug 31 is described.

A process has a fiber terminal end treatment step, a ferrule assembly accommodation step and first to third spring cap assembly steps.

First, the ferrule assemblies 32 are formed in the fiber terminal end treatment step (cf. FIG. 1 and FIG. 2). That is, the compression springs 40 are put over the optical fiber cables 37,38, and the ferrules 39 are connected to the ends of the optical fiber cables 37,38 so as to form the ferrule assemblies 32.

And, the above ferrule assemblies 32 are accommodated in the accommodating chambers 47 of the plug housing 33 in the ferrule assembly accommodation step (cf. FIG. 1 or FIG. 3).

Following the above, the first spring cap assembly step is carried out, wherein the lower spring cap 35 is to be engaged to the rear of the plug housing 33 (cf. FIG. 2 and FIG. 3). More specifically, after the optical fiber cables 37,38 being led out of the plug housing 33 straightly in an axial direction of each ferrule 39 have been accommodated in the straight path, and the lower spring cap 35 is to be engaged to the rear of the plug housing 33.

In this state, the guide ribs 49 of the plug housing 33 slide the guide rib engaging portions 56 of the lower spring cap 35, and, the engaging projections 51 of the plug housing 33 engage the holes 55 of the lower spring cap 35 (cf. FIG. 3).

After completion of the first spring cap assembly step, the second spring cap assembly step starts (cf. FIG. 3). In the second spring cap assembly step, the optical fiber cables 37,38 being in the straight path are curved along the curved path.

The curved optical fiber cables 37,38 are prevented from restoring by the sidewall 60.

And then, the third spring cap assembly step is carried out. (cf. FIG. 3 and FIG. 4) In this step, the upper spring cap 36 is to be coupled to the lower spring cap 35. The guide grooves 70 of the upper spring cap 36 are guided to the respective ribs 66 of the lower spring cap 35, and, the holes 69 of the upper spring cap 36 engages the respective engaging projections 65 of the lower spring cap 35.

The assembly of the optical plug 31 completes as described above.

As described with referring to FIGS. 1–9, because the optical connector according to the present embodiment has the optical plug 31 with the optical fiber cables 37,38 which have respective thinner curved portions, the work efficiency is enhanced, a downsizing is achieved, and a force required for coupling the optical plug 31 with a receptacle (not illustrated) is smaller.

The present invention is also applicable to an optical connector for a single optical fiber cable duplex transmission system.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical connector as an optical plug, comprising:

an optical fiber cable;

a ferrule connected to an end of the optical fiber cable and constructing a ferrule assembly along with the optical fiber cable;

a spring arranged over the optical fiber cable, an end of the spring pressing the ferrule;

a plug housing to accommodate the ferrule assembly and the spring; and a spring cap including a first spring cap and a second spring cap, connected to the plug housing for supporting another end of the spring and for curvingly leading the optical fiber cable, and leading out the optical fiber cable from a first opening portion, wherein a curved portion, provided inside the spring cap, of the optical fiber cable has a thinner cover than another portion of the optical fiber cable, and a second opening portion capable of leading out straight the optical fiber cable is provided on any one of the first spring cap and the second spring cap.

2. The optical connector as set forth in claim 1, wherein the curved portion starts from a position of an end of the ferrule.

3. The optical connector as set forth in claim 2, wherein the curved portion ends near an exit opening portion of the spring cap.

* * * * *